Sept. 29, 1970 E. W. ENGBERG 3,531,660

DIGITAL COAXIAL LINE DRIVER

Filed Nov. 21, 1967

INVENTOR.
EDWIN W. ENGBERG

BY Robert S. Clay

ATTORNEY 3,531,660
DIGITAL COAXIAL LINE DRIVER

Edwin W. Engberg, San Francisco, Calif., assignor to Ampex Corporation, Redwood City, Calif., a corporation of California Filed Nov. 21, 1967, Ser. No. 684,870
Int. Cl. H03k 1/02
U.S. Cl. 307—270 4 Claims

ABSTRACT OF THE DISCLOSURE

A driver circuit for providing a signal output to a terminated coaxial line wherein the output is unaffected by the addition of more terminated lines. A low output impedance feedback amplifier is coupled to the coaxial line and when the input thereto is at a low level, any error in the output is fed back to maintain the output signal at a constant high level. When the input is high, the output of the feedback amplifier falls to a low state, and any capacitive load at the output is discharged.

The invention herein described was made in the course of a contract with the Department of United States Army.

BACKGROUND OF THE INVENTION

Various systems are available for driving coaxial lines with a digital input, such as for example, periodically coupling the coaxial lines to a suitable source of voltage utilizing a transistor coupled to ground or by coupling the output of a "totem pole" circuit to the coaxial line. However, prior art systems in general do not provide digital information to the coaxial line which is of constant level. That is, in prior art driver circuits, the output level varies whenever the number of coaxial line terminations changes. In addition, the wave shape or phase of the driving signal generally is not preserved.

SUMMARY OF THE INVENTION

The present invention provides a digital coaxial line driver which provides a constant signal output which is unaffected by multiple, random additions of terminated coaxial lines. A first switch means introduces the digital information, in the form of high and low input signal levels, to a feedback amplifier which, in turn, produces low and high output signal levels respectively to the coaxial line. During the low input signal level, any error in the high output signal level is compared to a desired reference and is used to regulate the output signal level which is fed to the coaxial line. During the high input signal level, the first switch means turn of the feedback amplifier to provide the low output signal level to the coaxial line, and a second switch means couples the coaxial line to ground to discharge any load capacities in the line.

The present invention provides an output signal with relatively fast rise and fall times, with little delay, and with a response down to direct current (DC). The driver further provides power supply rejection and isolation between the input and output when the input threshold is exceeded. It is to be understood that the circuit is not limited to use with coaxial lines, but also is compatible with conventional resistor-transistor logic (RTL), transistor-transistor logic (TTL) and doide-transistor logic (DTL), circuits. To this end, the invention circuit is designed to operate off the supply voltage which is conventionally fed to logic circuits, and to provide in turn an output voltage which is compatible for driving logic circuits. The inventive circuit has the additional advantage of being particularly adapted for packaging as an integrated circuit.

DESCRIPTION OF THE PREFERRED EMBODIMENT

Figure 1:
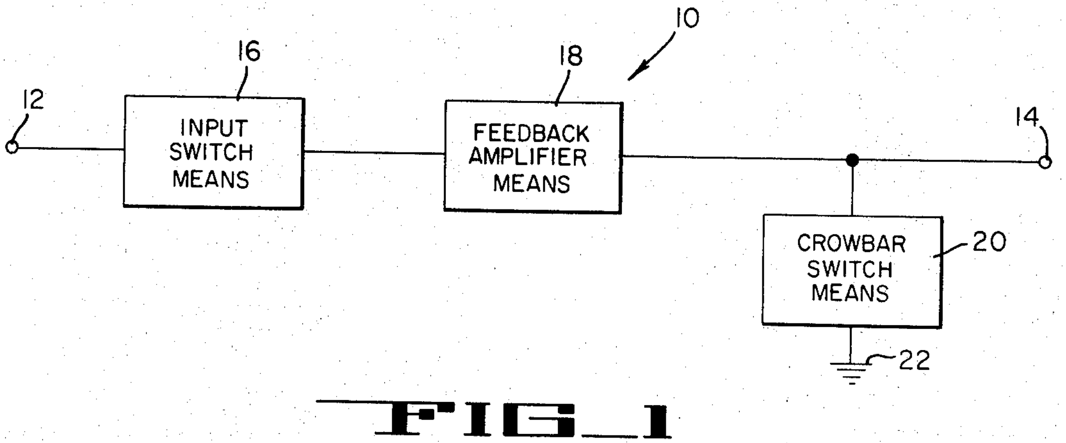
FIG. 1 is a simplified block diagram depicting the basic portions of the invention, and the combination thereof.

Referring to FIG. 1, there is shown a digital coaxial line driver 10, having an input terminal 12 coupled to a source of digital information (not shown), and an output terminal 14 coupled to a coaxial line (not shown). An input switch means 16 is connected to the input terminal 12, and in turn is coupled to a feedback amplifier means 18. The feedback amplifier means 18 is a stable, low output impedance amplifier which has sufficient open loop gain to maintain its output signal level constant. The output of the feedback amplifier means 18 is coupled to the output terminal 14 and thus to the associated coaxial line, and in addition, is coupled to a crowbar switch means 20. The output switch means 16 and the crowbar switch means 20 utilize matching components and the same drive to thus switch in relatively precise unison. The input switch means 16 operates at selected times commensurate with incoming digital information, and the crowbar switch means 20 operates in unison therewith to provide a path to a ground 22 at selected times to thus discharge any load capacities existing in the coaxial line.

Figure 2:
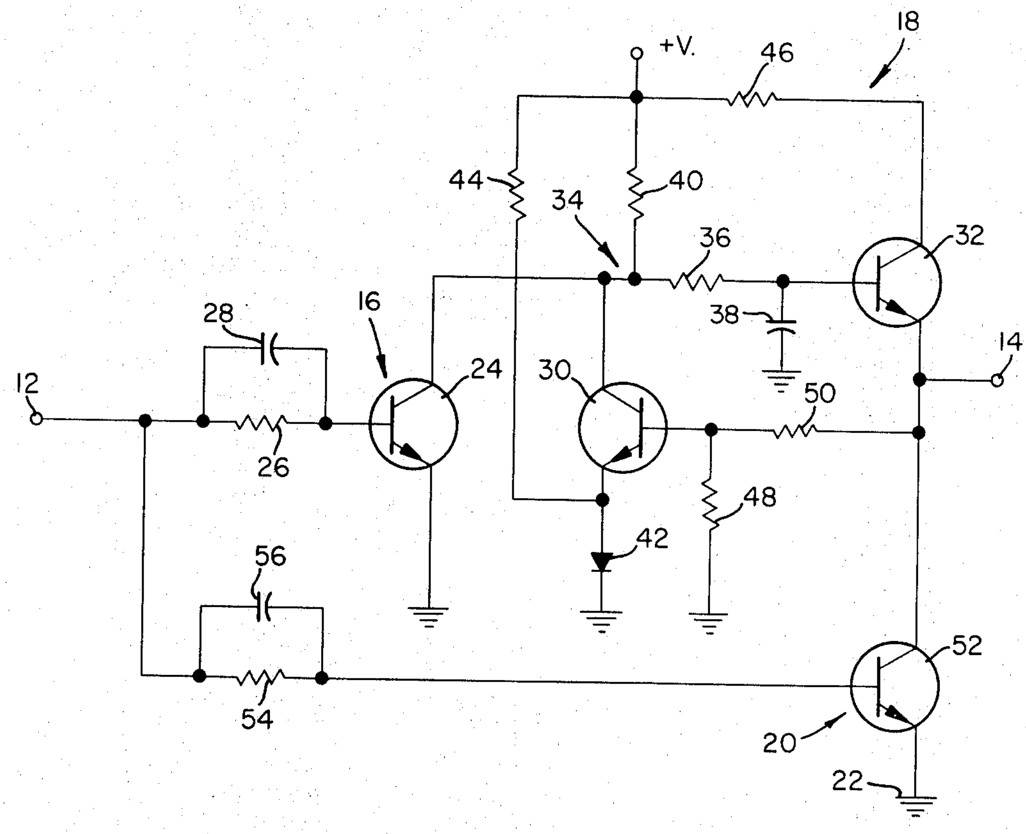
FIG. 2 is a schematic diagram of a specific embodiment of the invention, by way of example only.

Referring to FIG. 2, there is shown in detail an embodiment exemplifying the digital coaxial line driver 10 of FIG. 1. The input switch means 16 is formed of a transistor 24 having base, emitter and collector electrodes, wherein a resistor 26 is connected between the base thereof and the input terminal 12. A capacitor 28 is connected in parallel across the resistor 26. The emitter of transistor 24 is coupled to ground, and the collector thereof provides the input to the feedback amplifier means 18 as further described infra.

The feedback amplifier means 18 of previous mention may be likened to a regulated power supply circuit and defines a negative feedback amplifier using a pair of transistors 30 and 32 each having the usual base, emitter and collector electrodes. The collector of transistor 30 is coupled to the collector of transistor 24 wherein the common junction 34 therebetween defines the input to the feedback amplifier means 18 from the input switch means 16. The base of the transistors 32 is coupled to the common junction 34 via a resistor 36 and is also coupled to ground via a capacitor 38. The resistor 36 and the capacitor 38 form an RC circuit which determines the dominant time constant of the amplifier means 18 and which affects the degree of stability, and thus the tendency to oscillate, of the amplifier means 18.

The junction 34 is also coupled to a positive voltage source (not shown) via a resistor 40. The emitter of the transistor 30 is coupled to ground by means of a diode 42, which has its anode connected to the emitter and its cathode connected to ground. The diode 42 provides a reference voltage against which the output of the amplifier means 18 is compared, to provide the error signal which compensates for output variations. A resistor could be used in place of the diode 42 to provide the reference voltage. However, since it is desirable that the collector current not affect the emitter voltage of the transistor 30, it is preferable to utilize the diode 42 as shown. The junction between the emitter and the diode is also coupled to the positive voltage source of previous mention via a resistor 44. Resistor 44 biases diode 42 at a current that is large compared to the collector current of the transistor 30.

The collector of transistor 32 is coupled to the positive voltage source via a resistor 46 and the emitter thereof is coupled to the output terminal 14. The base of the transistor 30 is coupled to ground by a resistor 48 and also to the output terminal 14 via a resisor 50. The resistors 48 and 50 define a voltage divider which determines the output signal level seen at the output terminal 14. The resistor 46 provides short circuit current limiting effects in case the output is shorted.

The crowbar switch means 20 of previous mention includes a transistor 52 having base, emitter and collector electrodes, wherein the collector is connected to the output terminal 14, the emitter is connected to ground, and the base is connected to the input terminal 12 via a resistor 54. A capacitor 56 may be connected in parallel across the resistor 54.

Generally, the transistor 30 amplifies any error voltage which exists between the desired output level determined by the voltage divider formed of resistors 48 and 50, and the reference voltage determined by the diode 42. The transistor 32 defines an emitter follower circuit which provides a low output impedance as seen by the coaxial line. Transistor 24 acts as a switch means which controls the transistors 30 and 32 in relation to the incoming digital information at the input terminal 12, and transistor 52 acts as a switch means which shorts the output terminal 14 to ground when the output signal level is low in unison with the operation of transistor 24.

More particularly, in operation the input is introduced in the form of a square wave having high and low levels which represent the digital information. When the low level of the digital information is introduced to the input terminal 12, the base of transistor 24 is in a low state and the transistors 24 and 52 are turned off. Thus transistors 30 and 32 are turned on. Transistor 32 is connected as an emitter follower circuit with the terminated coaxial line coupled to the output terminal 14 as its emitter load. At such time as the input is at the low level the output voltage is fed back from the feedback amplifier means 18 by means of resistors 48 and 50, and is compared with the voltage across the diode 42. Transistor 30 amplifies any error signal determined by the comparison and applies it to the base of the transistor 32 as as negative feedback. This maintains the output of the feedback amplifier means 18 at a constant preselected level.

When the input at terminal 12 goes to a high level, the transistors 24 and 52 are turned on in unison. The high level may be a positive level in the circuit of FIG. 2 or may be a negative level if PNP transistors are used in place of the NPN transistors shown in the circuit, with, in addition, an appropriate supply voltage change. Transistor 24 turns off transistor 32 allowing the output of the feedback amplifier means 18 to fall to a low state. The transistor 52 is also on and provides accordingly a path from the output terminal 14 to ground 22 to discharge any capacitive load, thus preventing any increase in fall time of the output signal which would be caused by capacitive loading.

There are various modifications which may be made to the embodiment of FIG. 2 within the spirit of the invention. For example, the current limiting resistor 46 may be placed in series with the output of the driver 10. However, this would cause an increase in the output impedance, and the coaxial line coupled thereto could be terminated only once rather than a multiple number of times as is possible when resistor 46 is in the collector circuit of transistor 32.

Further, since the function of the diode 42 is to provide a reference voltage, other means such as the resistor of previous mention may be utilized in place of the diode 42 to provide such a voltage. Or, a battery or a regulated power supply may be used in place of the diode 42.

The circuit may be modified by omitting the capacitor 38 and utilizing a transistor 32 and a transistor 30 with chosen parameters that would not allow oscillation, which modification would decrease the time constant and thus make the circuit operate faster.

In still a further embodiment, the diode 42 is omitted and the emitter of the transistor 30 is grounded. The resistor 44 is then omitted, the grounded end of resistor 48 is coupled instead to a selected negative voltage when the voltage applied to the collectors of transistors 30, 32 is positive. The negative voltage would become the reference voltage previously supplied by the diode 42. The negative voltage should preferably be of the order of 5 to 10 times greater than the positive voltage to provide a more constant output.

The circuit is described utilizing a crowbar switch means 20 in order to increase the speed of the circuit, viz, by discharging any capacitive load and thus decreasing the fall time of the output signal. However, if speed is not essential, the driver 10 may be employed without the crowbar switch means 20.

Thus it is not intended to limit the invention except as defined in the following claims.

I claim:

1. A low output impedance driver circuit for introducing digital information from a source to a selceted load, the driver circuit having a constant output signal which is unaffected by variations in the loading, comprising the combination of;

input switch means coupled to the digital information and responsvie thereto to sense low and high input signal levels;

feedback amplifier means operatively coupled to the input switch means for providing low and high output signal levels to the load commensurate with the digital information, the feedback amplifier means further including means for selectively comparing the high output signal level with a selected reference voltage to provide negative feedback in proportion to variations therebetween to maintain the output level substantially constant in response to the input switch means regardless of the variations in the loading; and crowbar switch means coupled from the digital information source to said load to selectively short the load to ground in direct response to the digital information.

2. The driver of claim 1 wherein said input switch means includes a transistor having a base electrode coupled to the digital information source and connected to define an emitter follower circuit, and said crowbar switch means includes a crowbar transistor having a base electrode coupled to the digital information source which operates in unison with the transistor of the input switch means, to selectively provide a path from the load to ground.

3. The driver of claim 2 wherein the feedback amplifier means includes a feedback transistor having a base, a voltage divider coupled from the base to the load, and means for providing a reference voltage coupled thereto, wherein the output signal level is high when both switch means are off and the high signal level is compared with the reference voltage via the feedback transistor, and the output signal level is low when both switch means are on and the load is shorted to ground via the crowbar transistor.

4. The driver of claim 3 wherein said means for providing a reference voltage includes a diode coupled between the feedback transistor and ground.

References Cited

UNITED STATES PATENTS 3,436,563 4/1969 Regitz ............. 307—270

OTHER REFERENCES

IBM Technical Disclosure Bulletin, vol. 7, No. 6, p. 440, written by J. B. Gillett, titled Low Impedance Switch Circuit, dated November 1964.

IBM Technical Disclosure Bulletin, vol. 9, No. 6, p. 709, written by R. A. Schumacher, titled D.C. Driver Feedback Circuit, dated November 1966.

STANLEY T. KRAWCZEWICZ, Primary Examiner

U.S. Cl. X.R.

307—254; 328—100